(12) United States Patent
Wang et al.

(10) Patent No.: US 11,688,404 B2
(45) Date of Patent: Jun. 27, 2023

(54) FULLY SUPERVISED SPEAKER DIARIZATION

(71) Applicant: Google LLC, Mountain View, CA (US)

(72) Inventors: Chong Wang, Bellevue, WA (US); Aonan Zhang, Mountain View, CA (US); Quan Wang, Hoboken, NJ (US); Zhenyao Zhu, Mountain View, CA (US)

(73) Assignee: Google LLC, Mountain View, CA (US)

( * ) Notice: Subject to any disclaimer, the term of this patent is extended or adjusted under 35 U.S.C. 154(b) by 212 days.

(21) Appl. No.: 17/303,283

(22) Filed: May 26, 2021

(65) Prior Publication Data

US 2021/0280197 A1 Sep. 9, 2021

Related U.S. Application Data

(63) Continuation of application No. 16/242,541, filed on Jan. 8, 2019, now Pat. No. 11,031,017.

(51) Int. Cl.
*G10L 17/04* (2013.01)
*G10L 15/04* (2013.01)
(Continued)

(52) U.S. Cl.
CPC .............. *G10L 17/04* (2013.01); *G10L 15/04* (2013.01); *G10L 15/075* (2013.01); *G10L 15/26* (2013.01);
(Continued)

(58) Field of Classification Search
CPC ......... G10L 17/04; G10L 17/18; G10L 17/02; G10L 17/00; G10L 15/075; G10L 15/04
See application file for complete search history.

(56) References Cited

U.S. PATENT DOCUMENTS

| 8,554,562 B2 | 10/2013 | Aronowitz |
| 8,554,563 B2 | 10/2013 | Aronowitz |

(Continued)

FOREIGN PATENT DOCUMENTS

TW 201824250 A 7/2018

OTHER PUBLICATIONS

Tang, Hao, et al. "Partially supervised speaker clustering." IEEE transactions on pattern analysis and machine intelligence 34.5 (2011): 959-971. (Year: 2011).*

(Continued)

*Primary Examiner* — Brian L Albertalli
(74) *Attorney, Agent, or Firm* — Honigman LLP; Brett A. Krueger; Grant Griffith

(57) ABSTRACT

A method includes receiving an utterance of speech and segmenting the utterance of speech into a plurality of segments. For each segment of the utterance of speech, the method also includes extracting a speaker=discriminative embedding from the segment and predicting a probability distribution over possible speakers for the segment using a probabilistic generative model configured to receive the extracted speaker-discriminative embedding as a feature input. The probabilistic generative model trained on a corpus of training speech utterances each segmented into a plurality of training segments. Each training segment including a corresponding speaker-discriminative embedding and a corresponding speaker label. The method also includes assigning a speaker label to each segment of the utterance of speech based on the probability distribution over possible speakers for the corresponding segment.

20 Claims, 10 Drawing Sheets

(51) Int. Cl.
*G10L 15/07* (2013.01)
*G10L 17/02* (2013.01)
*G10L 17/18* (2013.01)
*G10L 15/26* (2006.01)
*G10L 17/00* (2013.01)

(52) U.S. Cl.
CPC .............. *G10L 17/00* (2013.01); *G10L 17/02* (2013.01); *G10L 17/18* (2013.01)

(56) References Cited

U.S. PATENT DOCUMENTS

| | | |
|---|---|---|
| 9,324,320 B1 | 4/2016 | Stolcke et al. |
| 9,460,722 B2 | 10/2016 | Sidi et al. |
| 9,875,742 B2 | 1/2018 | Gorodetski et al. |
| 9,875,743 B2 | 1/2018 | Gorodetski et al. |
| 9,881,617 B2 | 1/2018 | Sidi et al. |
| 10,026,405 B2 | 7/2018 | Arslan et al. |
| 10,109,280 B2 | 10/2018 | Sidi et al. |
| 10,133,538 B2 | 11/2018 | McLaren et al. |
| 10,134,401 B2 | 11/2018 | Ziv et al. |
| 10,141,009 B2 | 11/2018 | Khoury et al. |
| 10,249,305 B2 | 4/2019 | Yu |
| 10,559,311 B2 | 2/2020 | Baughman et al. |
| 10,699,700 B2 | 6/2020 | Qian et al. |
| 2009/0319269 A1 | 12/2009 | Aronowitz |
| 2018/0082689 A1 | 3/2018 | Khoury et al. |
| 2018/0166066 A1 | 6/2018 | Dimitriadis et al. |
| 2018/0166067 A1 | 6/2018 | Dimitriadis et al. |
| 2018/0197548 A1 | 7/2018 | Palakodety et al. |
| 2018/0218738 A1 | 8/2018 | Gorodetski et al. |
| 2018/0254040 A1 | 9/2018 | Droppo et al. |
| 2020/0043508 A1 | 2/2020 | Song et al. |
| 2020/0152207 A1 | 5/2020 | Wang et al. |
| 2020/0160845 A1 | 5/2020 | Lavilla et al. |

OTHER PUBLICATIONS

Yu, Chengzhu, and John HL Hansen. "Active learning based constrained clustering for speaker diarization." IEEE/ACM Transactions on Audio, Speech, and Language Processing 25.11 (2017): 2188-2198. (Year: 2017).*

Karu, Martin, and Tanel Alumae "Weakly supervised training of speaker identification models," arXiv preprint arXiv: 1806.08621 (2018). (Year: 2018).

Blei, David M., and Peter I. Frazier. "Distance Dependent Chinese Restaurant Processes." Journal of Machine Learning Research 12.8 (2011). (Year: 2011).

Zhang, Aonan, et al. "Fully Supervised Speaker Diarization." arXiv (2018): arXiv-1810. (Year: 2018).

Wang, Quan, et al. "Speaker Diarization with LSTM." arXiv preprint arXiv:1710.10468 (2017). (Year: 2017).

Asawa, C. Chaitanya, Nikhil Bhattasali, and Allan Jiang. "Deep learning approaches for online speaker diarization." (2017). (Year: 2017).

Karpathy et al., "Generative Models". OpenAI, Jun. 16, 2016, openai.com/blog/generative-models/ (Year: 2016).

Wang, "Accurate Online Speaker Diarization with Supervised Learning", Google AI Blog, Nov. 12, 2018, ai.googleblog.com/ 2018/11/ accurate-online-speaker-diarization.html. (Year: 2018).

* cited by examiner

400

| d-vector | Method | Training data | DER (%) |
|---|---|---|---|
| V1 | k-means | — | 17.4 |
|  | spectral | — | 12.0 |
|  | UIS-RNN | 5-fold | 11.7 |
|  | UIS-RNN | Disk-6 + ICSI | 11.7 |
|  | UIS-RNN | 5-fold + Disk-6 + ICSI | 10.6 |
| V2 | k-means | — | 19.1 |
|  | spectral | — | 11.6 |
|  | UIS-RNN | 5-fold | 10.9 |
|  | UIS-RNN | Disk-6 + ICSI | 10.8 |
|  | UIS-RNN | 5-fold + Disk-6 + ICSI | 9.6 |
| V3 | k-means | — | 12.3 |
|  | spectral | — | 8.8 |
|  | UIS-RNN | 5-fold | 8.5 |
|  | UIS-RNN | Disk-6 + ICSI | 8.2 |
|  | UIS-RNN | 5-fold + Disk-6 + ICSI | 7.6 |
| Castaldo et al. [ ] | | | 13.7 |
| Shum et al. [ ] | | | 14.5 |
| Senoussaoui et al. [ ] | | | 12.1 |
| Sell et al. [ ] (+VB) | | | 13.7 (11.5) |
| Garcia-Romero et al. [ ] (+VB) | | | 12.8 (9.9) |

FIG. 4

FULLY SUPERVISED SPEAKER DIARIZATION

CROSS REFERENCE TO RELATED APPLICATIONS

This U.S. patent application is a continuation of, and claims priority under 35 U.S.C. § 120 from, U.S. patent application Ser. No. 16/242,541, filed on Jan. 8, 2019. The disclosure of this prior application is considered part of the disclosure of this application and is hereby incorporated by reference in its entirety.

TECHNICAL FIELD

This disclosure relates to fully supervised speaker diarization.

BACKGROUND

Speaker diarization is the process of partitioning an input audio stream into homogenous segments according to speaker identity. In an environment with multiple speakers, speaker diarization answers the question "who is speaking when" and has a variety of applications including multimedia information retrieval, speaker turn analysis, and audio processing to name a few. In particular, speaker diarization systems are capable of producing speaker boundaries that have the potential to significantly improve acoustic speech recognition accuracy.

SUMMARY

One aspect of the disclosure provides a method of speaker diarization that includes receiving, at data processing hardware, an utterance of speech and segmenting, by the data processing hardware, the utterance of speech into a plurality of segments. For each segment of the utterance of speech, the method also includes: extracting, by the data processing hardware, a speaker-discriminative embedding from the segment; and predicting, by the data processing hardware, a probability distribution over possible speakers for the segment using a probabilistic generative model configured to receive the extracted speaker-discriminative embedding as a feature input. The probabilistic generative model is trained on a corpus of training speech utterances, with each training speech utterance segmented into a plurality of training segments. Each training segment includes a corresponding speaker-discriminative embedding and a corresponding speaker label.

Implementations of the disclosure may include one or more of the following optional features. In some implementations, the probabilistic generative model predicts the probability distribution over possible speakers for each segment by applying a distance-dependent Chinese restaurant process. The probabilistic generative model may further be configured to, for each segment occurring after an initial segment of the plurality of segments, receive the speaker-discriminative embedding extracted from a previous adjacent segment and the speaker label assigned to the previous adjacent segment as feature inputs for predicting a probability that a speaker will not change for the corresponding segment. In some examples, assigning the speaker label to each segment of the utterance of speech comprises assigning the speaker label to each segment of the utterance of speech by executing a greedy search on the probability distribution over possible speaker for the corresponding segment.

In some examples, predicting the probability distribution over possible speakers for the segment includes, when the segment occurs after an initial segment of the plurality of segments: (1) predicting a probability that a current speaker associated with the speaker label assigned to a previous adjacent segment will not change for the segment; (2) for each existing speaker associated with a corresponding speaker label previously assigned to one or more previous segments, predicting a probability that the current speaker associated with the speaker label assigned to the previous adjacent segment will change to the existing speaker; and (3) predicting a probability that the current speaker associated with the speaker label assigned to the previous adjacent segment will change to a new speaker. In some scenarios, the probability that the current speaker associated with the speaker label assigned to the previous adjacent segment will change to the existing speaker is proportional to a number of instances the corresponding speaker label associated with the existing speaker was previously assigned. Additionally or alternatively, the probability that the current speaker associated with the speaker label assigned to the previous adjacent segment will change to the new speaker is proportional to a speaker assignment probability parameter $\alpha$.

In some implementations, extracting the speaker-discriminative embedding from the segment comprises extracting a d-vector from the segment. In other implementations, extracting the speaker-discriminative embedding from the segment comprises extracting an i-vector from the segment. In some configurations, the probabilistic generative model includes a recurrent neural network (RNN). In these configurations, the RNN may include a hidden layer with N gated recurrent unit (GRU) cells and two fully-connected layers each having N nodes and configured to apply a rectified linear unit (ReLU) activation of the hidden layer. Each GRU cell is configured to apply hyperbolic tangent (tanh) activation. Additionally or alternatively, the method may also include: transcribing, by the data processing hardware, the utterance of speech into corresponding text; and annotating, by the data processing hardware, the text based on the speaker label assigned to each segment of the utterance of speech. Segmenting the utterance of speech into the plurality of segments including segmenting the utterance of speech into a plurality of fixed-length segments or into a plurality of variable-length segments.

Another aspect of the disclosure provides a system for speaker diarization that includes data processing hardware and memory hardware in communication with the data processing hardware. The memory hardware stores instructions, that when executed by the data processing hardware, cause the data processing hardware to perform operations that include receiving an utterance of speech and segmenting the utterance of speech into a plurality of segments. For each segment of the utterance of speech, the operations also include: extracting a speaker-discriminative embedding from the segment and predicting a probability distribution over possible speakers for the segment using a probabilistic generative model configured to receive the extracted speaker-discriminative embedding as a feature input. The probabilistic generative model is trained on a corpus of training speech utterances, with each training speech utterance segmented into a plurality of training segments. Each training segment includes a corresponding speaker-discriminative embedding and a corresponding speaker label.

This aspect may include one or more of the following optional features. In some implementations, the probabilistic generative model predicts the probability distribution over possible speakers for each segment by applying a distance-dependent Chinese restaurant process. The probabilistic generative model may further be configured to, for each segment occurring after an initial segment of the plurality of segments, receive the speaker-discriminative embedding extracted from a previous adjacent segment and the speaker label assigned to the previous adjacent segment as feature inputs for predicting a probability that a speaker will not change for the corresponding segment. In some examples, assigning the speaker label to each segment of the utterance of speech comprises assigning the speaker label to each segment of the utterance of speech by executing a greedy search on the probability distribution over possible speaker for the corresponding segment.

In some examples, predicting the probability distribution over possible speakers for the segment includes, when the segment occurs after an initial segment of the plurality of segments: (1) predicting a probability that a current speaker associated with the speaker label assigned to a previous adjacent segment will not change for the segment; (2) for each existing speaker associated with a corresponding speaker label previously assigned to one or more previous segments, predicting a probability that the current speaker associated with the speaker label assigned to the previous adjacent segment will change to the existing speaker; and (3) predicting a probability that the current speaker associated with the speaker label assigned to the previous adjacent segment will change to a new speaker. In some scenarios, the probability that the current speaker associated with the speaker label assigned to the previous adjacent segment will change to the existing speaker is proportional to a number of instances the corresponding speaker label associated with the existing speaker was previously assigned. Additionally or alternatively, the probability that the current speaker associated with the speaker label assigned to the previous adjacent segment will change to the new speaker is proportional to a speaker assignment probability parameter $\alpha$.

In some implementations, extracting the speaker-discriminative embedding from the segment comprises extracting a d-vector from the segment. In other implementations, extracting the speaker-discriminative embedding from the segment comprises extracting an i-vector from the segment. In some configurations, the probabilistic generative model includes a recurrent neural network (RNN). In these configurations, the RNN may include a hidden layer with N gated recurrent unit (GRU) cells and two fully-connected layers each having N nodes and configured to apply a rectified linear unit (ReLU) activation of the hidden layer. Each GRU cell is configured to apply hyperbolic tangent (tanh) activation. Additionally or alternatively, the operations may also include: transcribing the utterance of speech into corresponding text and annotating the text based on the speaker label assigned to each segment of the utterance of speech. Segmenting the utterance of speech into the plurality of segments including segmenting the utterance of speech into a plurality of fixed-length segments or into a plurality of variable-length segments.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 4 is a table illustrating diarization error rates (DERs) for diarization systems trained on unsupervised datasets and supervised datasets for various speaker recognition models.

Like reference symbols in the various drawings indicate like elements.

DETAILED DESCRIPTION

Figure 1A:
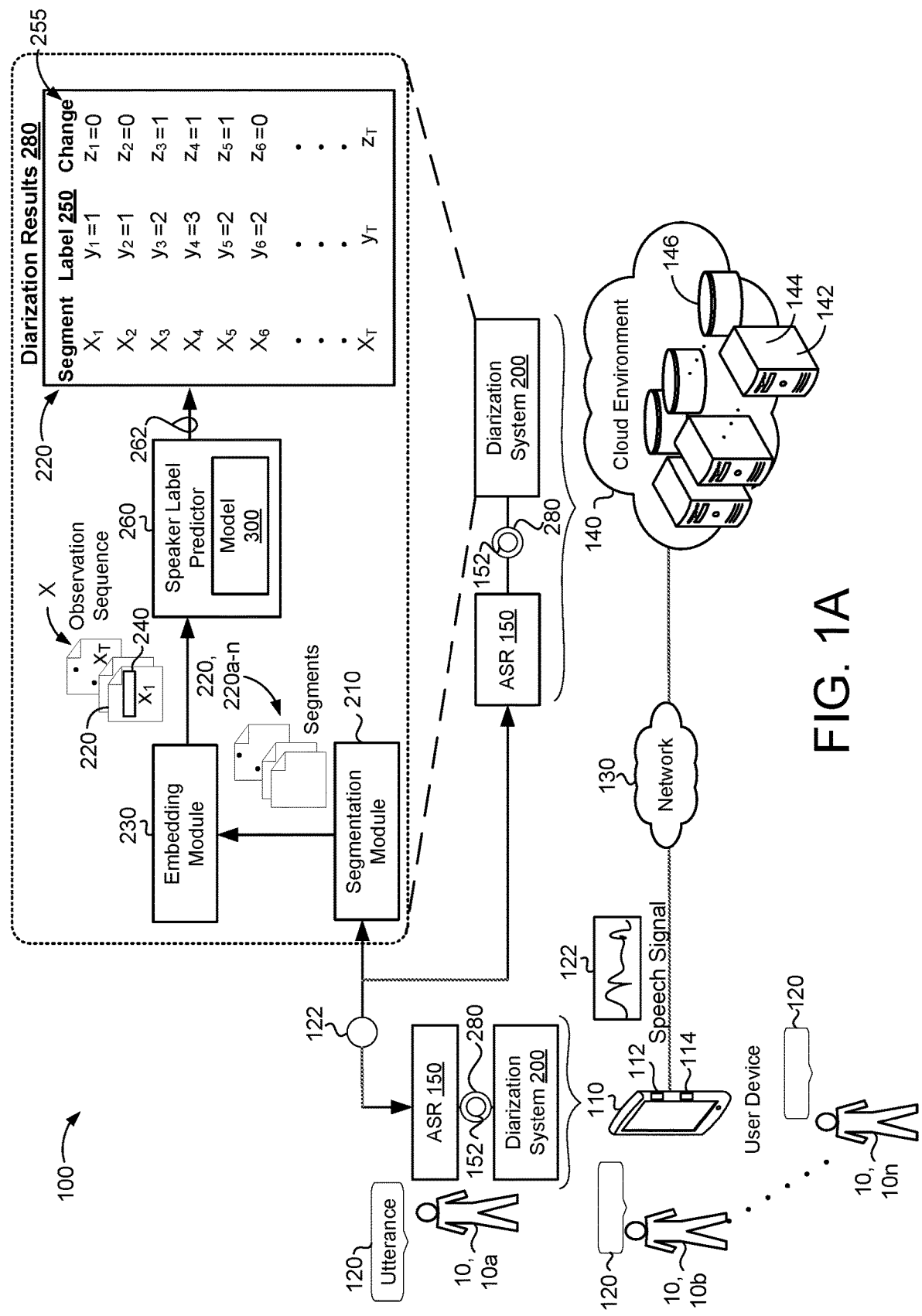
FIG. 1A schematically illustrates an example system for assigning speaker labels to an utterance of speech.

Automatic speech recognition (ASR) systems generally rely on speech processing algorithms that assume only one speaker is present in a given input audio signal. An input audio signal that includes a presence of multiple speakers can potentially disrupt these speech processing algorithms, thereby leading to inaccurate speech recognition results output by the ASR systems. As such, speaker diarization is the process of segmenting speech from a same speaker in a larger conversation to not specifically determine who is talking (speaker recognition/identification), but rather, determine when someone is speaking. To put another way, speaker diarization includes a series of speaker recognition tasks with short utterances and determines whether two segments of a given conversation were spoken by the same individual, and repeated for all segments of the conversation.

Existing speaker diarization systems generally include multiple relatively independent components, such as, without limitation, a speech segmentation module, an embedding extraction module, and a clustering module. The speech segmentation module is generally configured to remove non-speech parts from an input utterance and divide the input utterance into small fixed-length segments, while the embedding extraction module is configured to extract, from each fixed-length segment, a corresponding speaker-discriminative embedding. The speaker-discriminative embeddings may include i-vectors or d-vectors. The clustering modules employed by the existing speaker diarization systems are tasked with determining the number of speakers present in the input utterance and assign speaker identifies (e.g., labels) to each fixed-length segment. These clustering modules may use popular clustering algorithms that include Gaussian mixture models, mean shift clustering, agglomerative hierarchical clustering, k-means clustering, links clustering, and spectral clustering. Speaker diarization systems may also use an additional re-segmentation module for further refining the diarization results output from the clustering module by enforcing additional constraints.

The clustering module operates in an unsupervised manner such that all speakers are assumed to be unknown and the clustering algorithm needs to produce new "clusters" to accommodate the new/unknown speakers for every new input utterance. The drawback with these unsupervised frameworks is that they are unable to improve by learning from large sets of labeled training data that includes time-stamped speaker labels and ground truth. Since this labeled training data is readily obtainable in many domain-specific applications, speaker diarization systems could benefit from the labeled training data by becoming more robust and accurate in producing diarization results. Moreover, existing state-of-the-art clustering algorithms mostly execute offline, thereby making it difficult to produce diarization results by clustering in real-time scenarios.

Implementations herein are directed toward a speaker diarization system that implements a fully supervised probabilistic generative model for producing diarization results online (e.g., in real-time). The diarization results include a speaker label predicted for each of a plurality of segments segmented from an input audio signal. By replacing a commonly used clustering module that relies on an unsupervised clustering algorithm (e.g., k-means, spectral clustering, hierarchical clustering, etc.) with the fully supervised probabilistic generative model, the speaker diarization system is able to improve in speaker label prediction accuracy by learning from time-stamped speaker labels and ground truth that are easily obtainable. The segments may be fixed-length or variable-length.

Specifically, the probabilistic generative model includes an unbounded interleaved-state recurrent neural network (UIS-RNN) that naturally incorporates time-stamped speaker labels for training such that the model models each speaker by a corresponding instance that shares the same parameters as the other instances, generates an unbounded number of RNN instances, and interleaves the states of different RNN instances (i.e., different speakers) in the time domain. This fully supervised framework enables the model to automatically learn a number of speakers within each utterance via a Bayesian non-parametric process and carry information through time via the RNN.

Figure 1B:
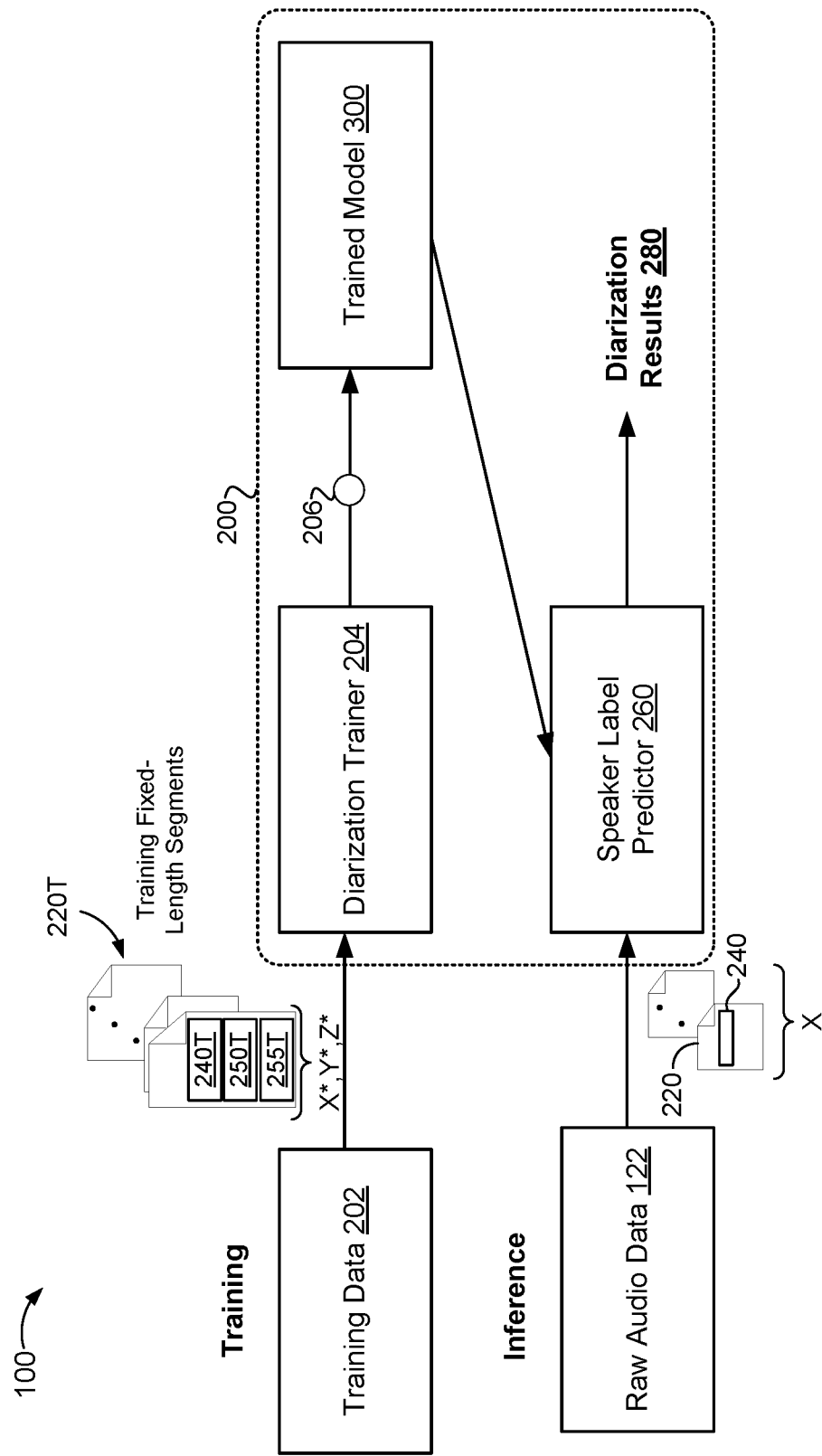
FIG. 1B schematically illustrates an example of using supervised training to train a probabilistic generative model of the system of FIG. 1A.

Referring to FIGS. 1A and 1B, in some implementations, a system 100 includes a user device 110 capturing speech utterances 120 from a group of speakers (e.g., users) 10, 10a—n and communicating with a remote system 140 via a network 130. The remote system 140 may be a distributed system (e.g., cloud computing environment) having scalable/elastic resources 142. The resources 142 include computing resources 144 (e.g., data processing hardware) and/or storage resources 146 (e.g. memory hardware). In some implementations, the user device 110 and/or the remote system 140 executes a diarization system 200 configured to receive audio data 122 that corresponds to the captured utterances 120 from the user device 110, segment the audio data 122 into a plurality of segments 220, 220a—n each associated with a corresponding speaker-discriminative embedding 240 extracted therefrom, and generate diarization results 280 that include a corresponding speaker label 250 assigned to each segment 220 using a probabilistic generative model 300. Thus, as each segment 220 indicates a corresponding speaker-discriminative embedding 240 for a corresponding time window of the input audio data 122, the diarization results 280 provide time-stamped speaker labels 250 for the received audio data 122 that not only identify who is speaking during a given segment 220, but also identify when speaker changes occur between adjacent segments 220. Described in greater detail below, the probabilistic generative model is trained on labeled training data 202 that includes time-stamped speaker labels 250T for a corpus of training speech utterances. The segments 220, 220a—n may include fixed-length segments or variable-length segments. While the present disclosure may refer to a segment or segments as being 'fixed-length', the corresponding segment or segments can similarly be variable-length without departing from the scope of the present disclosure. Moreover, the diarization system 200 may execute on either one of the user device 110 or the remote system 140 without departing from the scope of the present disclosure.

In some examples, the remote system 140 further executes an automated speech recognition (ASR) module 150 that is configured to receive and transcribe the audio data 122 into a corresponding ASR result 152. The user device 110 may similarly execute the ASR module 150 on-device in lieu of the remote system 140, which may be useful when network connections are unavailable or quick (albeit lower-fidelity) transcriptions are preferable. Additionally or alternatively, the user device 110 and the remote system 140 may both execute corresponding ASR modules 150 such that the audio data 122 can be transcribed on-device, via the remote system, or some combination thereof. In some implementations, the ASR module 150 and the diarization system 200 both execute entirely on the user device 110 and do not require any network connection to the remote system 140. The ASR result 152 may also be referred to as a 'transcription' or simply 'text'. The ASR module 150 may communicate with the diarization system 200 to utilize the diarization results 280 associated with the audio data 122 for improving speech recognition on the audio data 122. For instance, the ASR module 150 may apply different speech recognition models (e.g., language models, prosody models) for different speakers identified from the diarization results 280. Additionally or alternatively, the ASR module 150 and/or the diarization system 200 (or some other component) may index a transcription 152 of the audio data 122 using the time-stamped speaker labels 250 predicted for each fixed-length segment 220 obtained from the diarization results 280. For instance, a transcription of a conversation between multiple co-workers (e.g., speakers 10) during a business meeting may be indexed by speaker to associate portions of the transcription with the respective speaker for identifying what each speaker said.

The user device 110 includes data processing hardware 112 and memory hardware 114. The user device 110 may include an audio capture device (e.g., microphone) for capturing and converting the speech utterances 120 from the speakers 10 into the audio data 122 (e.g., electrical signals). In some implementations, the data processing hardware 112 is configured to execute a portion of the diarization system 200 locally while a remaining portion of the diarization system 200 executes on the remote system 140. Alternatively, the data processing hardware 112 may execute the diarization system 200 in lieu of executing the diarization system 200 on the remote system 140.

The user device 110 can be any computing device capable of communicating with the remote system 140 through the network 130. The user device 110 includes, but is not limited to, desktop computing devices and mobile computing devices, such as laptops, tablets, smart phones, and wearable computing devices (e.g., headsets and/or watches). The user device 110 may optionally execute the ASR module 150 to transcribe the audio data 122 into corresponding text 152. For instance, when network communications are down or not available, the user device 110 may execute the diarization system 200 and/or the ASR module 150 locally to produce the diarization results for the audio data 122 and/or generate a transcription 152 of the audio data 122.

In the example shown, the speakers 10 and the user device 110 may be located within an environment (e.g., a room) where the user device 110 is configured to capture and covert speech utterances 120 spoken by the speakers 10 into the audio data 122 (also referred to as audio signal 122). For instance, the speakers 10 may correspond to co-workers having a conversation during a meeting and the user device 110 may record and convert the speech utterances 120 into the audio data 122. In turn, the user device 110 may provide the audio data 122 to the diarization system 200 for assigning time-stamped speaker labels 250 to individual fixed-length segments 220 of the audio data 122. Thus, the diarization system 200 is tasked with processing the audio data 122 to determine when someone is speaking without specifically determining who is talking via speaker recognition/identification. In some examples, the user device 110 may be remotely located from the speakers 10. For instance, the user device 110 may include a remote device (e.g., a network server) that captures speech utterances 120 from speakers that are participants in a phone call or video conference. In this scenario, each speaker 10 would speak into their own device (e.g., phone, radio, computer, smartwatch, etc.) that captures and provides the speech utterances 120 to the remote user device 110 for converting the speech utterances 120 into the audio data 122. Of course in this scenario, the utterances 120 may undergo processing at each of the user devices and be converted into corresponding audio signals transmitted to the remote user device 110 which may additionally processes the audio data 122 provided to the diarization system 200.

In the example shown, the diarization system 200 includes a segmentation module 210, an embedding module 230, and a speaker label predictor 260. The segmentation module 210 is configured to receive the audio data 122 corresponding to the speech utterance 120 (also referred to as 'utterance of speech') and segment the audio data 122 into the plurality of fixed-length segments 220. The segmentation module 210 may further remove non-speech parts from the audio data 122, e.g., by applying a voice activity detector.

The embedding module 230 is configured to extract the speaker-discriminative embedding 240 from each fixed-length segment 220. Thereafter, the embedding module 230 provides an observation sequence of embeddings $X=(x_1, x_2, \ldots, x_T)$ to the speaker label predictor 260, where entry $x_T$ in the sequence represents a real-valued speaker-discriminative embedding 240 associated with a corresponding fixed-length segment 220 in the audio data 122 of the original utterance 120. The speaker-discriminative embeddings 240 may include speaker factors such as d-vectors or i-vectors. Advantageously, d-vectors may improve diarization performance due to the fact that neural networks generate d-vectors and can be trained with large datasets that are sufficiently robust against varying speaker accents and acoustic conditions in different use scenarios.

In some implementations, the speaker label predictor 260 receives the observation sequence of embeddings X and uses the probabilistic generative model 300 to generate/predict a probability distribution over possible speakers 262 for each entry $x_T$ in the sequence. In other words, for each fixed-length segment 220, the speaker label predictor 260 may receive the associated speaker-discriminative embedding 240 extracted from the embedding module 230 as a feature input to the probabilistic generative model 300 for generating the probability distribution over possible speakers 262 for the fixed-length segment 220. The speaker label predictor 260 may assign a speaker label 250 to each fixed-length segment 220 of the audio data 122 based on the probability distribution over possible speakers 262 for the fixed-length segment 220. In some examples, assigning the speaker label 250 to each fixed-length segment 220 includes executing a greedy search on the probability distribution over possible speakers 262 for the fixed-length segment 220.

In the example shown, the speaker label predictor 260 outputs diarization results 280 that indicate the speaker labels 250 assigned to the corresponding fixed-length segments 220 of the audio data 122. Here, the speaker labels 250 may be represented as a sequence of speaker labels $Y=(y_1, y_2, y_T)$, where entry $y_1$ in the sequence represents the speaker label 250 assigned to the embedding entry $x_t$ at time t. For instance, at time t=4, the speaker label entry $y_4=3$ corresponds to assigning a third speaker "3" to the fourth embedding entry $x_4$. Additionally, the diarization results 280 may predict a speaker change value 255 for each fixed-length segment 220. In the example shown, the speaker change values 255 may be represented as a sequence of change point indicators $Z=(z_1, z_2, z_T)$, where entry $z_t$ indicates whether or not a speaker change occurs at the corresponding embedding entry $x_t$ at time t. In some implementations, each change point indicator $z_T$ is a binary indicator, where $z_t=1$ indicates a change point at time t and $z_t=0$ indicates the speaker has not changed at time t from the speaker label 250 assigned to an immediately preceding adjacent embedding entry $x_{t-1}$. In the example diarization results 280 shown in FIG. 1A, when Y=(1, 1, 2, 3, 2, 2, . . . , $y_T$), then Z=(0, 1, 1, 1, 0). Accordingly, the sequence of change point indicators Z are uniquely determined by the sequence of speaker labels Y, but the sequence of speaker labels Y cannot be uniquely determined by the sequence of change point indicators Z.

Referring to FIG. 1B, in some implementations, the probabilistic generative model 300 is trained on fully-labeled training data 202 that includes a corpus of training speech utterances each segmented into a plurality of training fixed-length segments 220T, wherein each training fixed-length segment 220T includes a corresponding speaker-discriminative embedding 240T (e.g., d-vector or i-vector) and a corresponding speaker label 250T. Each training speech utterance in the corpus of training speech utterances may be represented as a training sequence of embeddings $X^*=(x^*_1, x^*_2, \ldots, x^*_T)$, where entry $x^*_T$ in the sequence represents a real-valued speaker-discriminative embedding 240T and corresponding speaker label 250T associated with a corresponding training fixed-length segment 220T. Additionally, the fully-labeled training data 202 may include a speaker change value 255T for each training fixed-length segment 220T after the initial training fixed-length segment 220T. The speaker change values 255T and the speaker labels 250T may be manually assigned to each training fixed-length segment 220T. As discussed above, the speaker labels 250T may be represented as a sequence of training speaker labels $Y^*=(y^*_1, y^*_2, \ldots, y^*_T)$, where entry $y_t$ in the sequence represents the speaker label 250T assigned to the embedding entry $x_t$ at time t and the speaker change values 255T may be represented as a sequence of training change point indicators $Z^*=(z^*_1, z^*_2, z^*_T)$, where entry $z_t$ is a binary indicator that indicates whether or not a speaker change occurs at the corresponding training fixed-length segment entry x*t at time t.

In the example shown, the plurality of training fixed-length segments 220T each including the corresponding speaker-discriminative embedding 240T (e.g., d-vector or i-vector) and the corresponding speaker label 250T passes to a diarization trainer 204 for training the probabilistic generative model 300. Based on the fully-labeled training data 202, the diarization trainer 204 is able to model diarization parameters 206 to train the probabilistic generative model 300. Once trained, the probabilistic generative model (e.g., trained model) 300 is used by the speaker label predictor 260 for generating diarization results 280 for corresponding raw audio data 122 during inference as discussed above with reference to FIG. 1A. Thus, where the training data 202 includes known speaker labels 250T assigned to corresponding training fixed-length segments 220T segmented from each training utterance, the trained probabilistic generative model 300 is tasked with predicting the speaker labels 250 assigned to corresponding fixed-length segments 220 segmented from the audio data 122 based only on the corresponding speaker-discriminative embeddings 240 extracted therefrom.

The probabilistic generative model 300 may include a neural network. The diarization trainer 204 maps the training data 202 to output data to generate the neural network model 300. Generally, the diarization trainer 204 generates hidden nodes, weights of connections between the hidden nodes and input nodes that correspond to the training data 202, weights of connections between the hidden nodes and output nodes, and weights of connections between layers of the hidden nodes themselves. Thereafter, the fully trained neural network model 300 may be employed against input data (e.g., raw audio data 122) to generate unknown output data (e.g., speaker labels 250).

Figure 2:
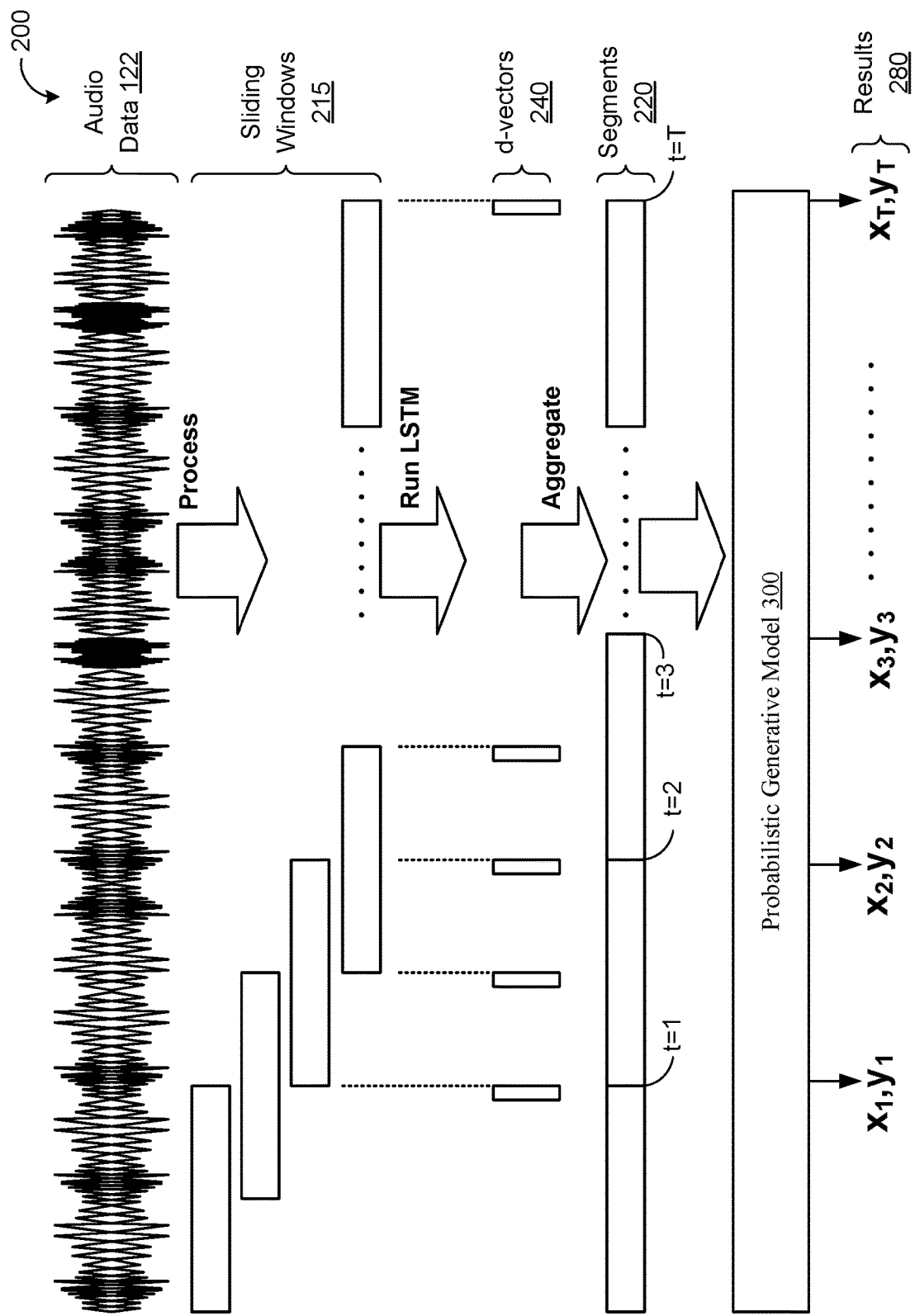
FIG. 2 schematically illustrates an example process of speaker diarization using a probabilistic generative model.

FIG. 2 shows an example process of the diarization system 200 of FIGS. 1A and 1B for generating diarization results 280 from received audio data 122. In the example shown, time increases from left to right and the diarization system 200 processes the audio data 122 to provide sliding windows 215 having a fixed size and a fixed overlap. For instance, the size of each window 215 may be 240 milliseconds (ms) and the fixed overlap between each sliding window 215 may be 50-percent (50%). The embedding module 230 (FIG. 1A) may include a text-independent speaker recognition network configured to extract window-level embeddings from the overlapping sliding windows 215 and average the window-level embeddings to generate segment-level d-vectors, e.g., speaker-discriminative embeddings 240. In the example shown, the text-independent speaker recognition network includes three long short-term memory (LSTM) layers and one linear layer, and is trained generalized end-to-end loss. In other examples, the embedding module 230 generates segment-level i-vectors. In some implementations, the segmentation module 210 (FIG. 1A) uses a voice activity detector (VAD) with two full-covariance Gaussians to remove non-speech parts from the audio data 122 and partition/segment the audio data 122 into the non-overlapping fixed-length segments 220. In some examples, each fixed-length segment 220 is 400 ms. Then, the speaker label predictor 260 (FIG. 1A) receives each fixed-length segment 220 and corresponding speaker-discriminative embedding 240, and uses the probabilistic generative model 300 to generate the diarization results 280. Here, the diarization results 280 include a speaker label 250, as represented as the sequence of speaker labels $Y=(y_1, y_2, \ldots y_T)$, assigned to each fixed-length segment 220, as represented as the observation sequence of embeddings $X=(x_1, x_2, \ldots x_T)$.

FIGS. 3A-3D show an example of the probabilistic generative model 300. In the example shown, the model 300 includes a recurrent neural network (RNN). While a general neural network does not store any intermediary data while processing input data to generate output data, a RNN does persist data/state, which may allow the RNN to improve classification ability over a general neural network that does not persist data/state. More specifically, the probabilistic generative model 300 includes an unbounded interleaved-state recurrent neural network (UIS-RNN) trained on the training data 202 by the diarization trainer 204 to model each speaker 10 in audio data 122 of a test utterance 120 by a corresponding instance that shares the same diarization parameters 206 as the other instances modeled for the other speakers 10. Time increases from left to right relative to the views of FIGS. 3A-3D. The UIS-RNN 300 is able to generate an unbounded number of RNN instances and interleave the states $h_t$ of different RNN instances (i.e., different speakers) in the time domain. Thus, the UIS-RNN 300 maintains multiple instantiations with each instantiation modeling a corresponding speaker and sharing the same set of diarization parameters 206 as the other instantiations. The diarization parameters 206 can include RNN parameters $\theta$, a speaker assignment probability parameter $\alpha$, a Gaussian model parameter $\sigma^2$, and a speaker change parameter $\lambda$.

In some examples, the UIS-RNN 300 includes a hidden layer having N gated recurrent unit (GRU) cells with hyperbolic tangent (tanh) activation and two fully-connected layers each having N nodes and configured to apply a rectified linear unit (ReLU) activation of the hidden layer. Each GRU cell may be represented by a corresponding hidden standard RNN state $h_t$, while the two fully-connected layers may be represented by the RNN output layer shown in FIGS. 3A-3D with each output node $m_t$ corresponding to a function of the hidden standard RNN state $h_t$ and the RNN parameters $\theta$. Here, each output node $m_t$ provides a non-linear transformation of the RNN state $h_t$ to a state better suited for generating the actual observations of speaker change. In the example shown, $m_t$ is equal to $h_t$, however more complex functions are possible.

For a given test utterance 120 (represented by audio data 122), the utterance 120 is segmented into a plurality of fixed-length segments 220 (e.g., using the segmentation module 210) and a speaker-discriminative embedding 240 is extracted from each fixed-length segment 220 (e.g., using the embedding module 230) to provide a corresponding observation sequence of embeddings $X=(x_1, x_2, x_3, x_4, x_5, x_6, x_7)$. Here, each embedding entry $x_{1-7}$ in the sequence represents a speaker-discriminative embedding 240 associated with a given fixed-length segment 220. In a general sense, each entry $X_{1-7}$ in the sequence corresponds to a time-stamped speaker-discriminative embedding 240 for the given utterance. For instance, entry $x_3$ represents the speaker-discriminative embedding 240 associated with the third-fixed length segment 220 extracted from the audio data 122 of the test utterance 120. Described in greater detail below, the UIS-RNN model 300 models speaker assignment and speaker change for an unbounded number of speakers to predict a speaker label 250 to assign to each corresponding fixed-length segment 220, whereby the speaker labels 250 are represented as a sequence of speaker labels $Y=(y_1, y_2, y_3, y_4, y_5, y_6, y_7)$.

The first embedding entry $x_1$ (i.e., the speaker-discriminative embedding 240 extracted from the first fixed-length segment 220) will always be assigned a first speaker label 250 associated with a first speaker ($y_1=1$). For each embedding entry $X_2$-$X_7$ following the first entry $x_1$ in the data sequence of observation sequence of embeddings, the UIS-RNN 300 is configured to predict a probability distribution over possible speakers 262 for the entry $x_t$ (i.e., the corresponding fixed-length segment 220 and associated speaker-discriminative embedding 240) and assign a speaker label 250 to the corresponding entry $x_1$ based on the probability distribution over possible speakers 262. In some examples, the speaker label 250 is assigned by executing a greedy search on the probability distribution over possible speakers 262. The greedy search may execute during a decoding process that implements a beam search. To model speaker assignment and speaker change, or more specifically speaker turn behavior, the UIS-RNN 300 may use a distance dependent Chinese restaurant process that includes a Bayesian non-parametric model configured to model an unbounded number of speakers. For example, when modeling speaker assignment for a next entry $x_t$ in the sequence, the UIS-RNN 300 predicts a probability for each existing speaker assignment up until the immediately previous entry $x_{t-1}$ and a probability of predicting a new speaker label for the next entry $x_t$.

At time t=1, the first speaker label associated with the first speaker $y_1=1$ is assigned to the first embedding entry $x_1$ and the corresponding first RNN state $h_1$ instantiates a new RNN corresponding to the first speaker with an initial hidden state $h_0$. Here, the first RNN state $h_1$ has no prior knowledge for the first speaker.

At time t=2, the first speaker label associated with the first speaker $y_2=1$ is assigned to the second embedding entry $x_2$ and the corresponding second RNN state $h_2$ updates the instantiation of the RNN corresponding to the first speaker with the previous first RNN state $h_1$ and the previous first embedding entry $x_1$ corresponding to the first speaker. Accordingly, the updated RNN corresponding to the first speaker is able to improve based on prior knowledge obtained from the previous RNN state $h_1$ and the previous embedding entry $x_1$. The previous embedding entry $x_1$ helps predict the speaker label $y_2$.

At time t=3, a second speaker label associated with a second speaker $y_3=2$ is assigned to the third embedding entry $x_3$ and the corresponding third RNN state $h_3$ instantiates a new RNN corresponding to the second speaker with the same initial hidden state $h_0$. Since the second speaker is new (e.g., has not appeared previously), the third RNN state $h_3$ has no prior knowledge for the second speaker. Moreover, information from the first and second RNN states $h_1$, $h_2$, do not pass into the RNN corresponding to the second speaker or any other RNN instantiated for speakers other than the first speaker.

At time t=4, a third speaker label associated with a third speaker $y_4=3$ is assigned to the fourth embedding entry $x_4$ and the corresponding fourth RNN state $h_4$ instantiates a new RNN corresponding to the third speaker with the same initial hidden state $h_0$. Since the third speaker is new (e.g., has not appeared previously), the fourth RNN state $h_4$ has no prior knowledge for the third speaker. Moreover, information from the first and second RNN states $h_1$, $h_2$ associated with the RNN corresponding to the first speaker and the third RNN state $h_3$ associated with the RNN corresponding to the second speaker do not pass into the RNN corresponding to the third speaker. While the instantiations of the RNNs model separate speakers, the RNNs share the same set of diarization parameters 206 and are both initialized with the same initial hidden state $h_0$.

At time t=5, the second speaker label associated with the second speaker $y_5=2$ is assigned to the fifth embedding entry $x_5$ and the corresponding fifth RNN state $h_5$ updates the instantiation of the RNN corresponding to the second speaker with the previous third RNN state $h_3$ and the previous third embedding entry $x_3$ corresponding to the second speaker. Accordingly, the updated RNN corresponding to the second speaker is able to improve based on prior knowledge obtained from the previous RNN state $h_3$ and the previous embedding entry $x_3$. The previous embedding entry $x_3$ corresponding to the second speaker helps predict the speaker label $y_5$.

At time t=6, the second speaker label associated with the second speaker $y_6=2$ is assigned to the sixth embedding entry $x_6$ and the corresponding sixth RNN state $h_6$ updates the instantiation of the RNN corresponding to the second speaker with the previous fifth RNN state $h_5$ and the previous fifth embedding entry $x_5$ corresponding to the second speaker. Accordingly, the updated RNN corresponding to the second speaker is able to improve based on prior knowledge obtained from the previous RNN state $h_5$ and the previous embedding entry $x_5$. The previous embedding entry $x_5$ helps predict the speaker label $y_6$.

Thus, at a current stage up to time t=6, FIGS. 3A-3D show the UIS-RNN 300 having predicted speaker labels 250, as represented as the sequence of speaker labels for $y_{[6]}=(1, 1, 2, 3, 2, 2)$, assigned to corresponding ones of the observation sequence of embeddings $X=(x_1, x_2, x_3, x_4, x_5, x_6)$. In the example shown, the blocks representing entries $x_1$, $x_2$ include horizontal lines denoting the assignment of the first speaker label associated with the first speaker, the blocks representing entries $x_3$, $x_5$, $x_6$ include vertical lines denoting the assignment of the second speaker label 250 associated with the second speaker, and the block representing the fourth entry $x_4$ includes diagonal lines denoting the assignment of the third speaker label 250 associated with the third speaker.

In the examples shown, the UIS-RNN is tasked with predicting a next speaker label $y_7$ to be assigned to the next embedding entry $x_7$ in the sequence. To do so, the UIS-RNN applies the distance dependent Chinese restaurant process. In this scenario, there are four options for $y_7$: (1) the first speaker; (2) the second speaker, (3) the third speaker, or (4) a fourth speaker. Options 1-3 all include existing speakers, with the probability for each existing speaker being proportional to a number of continuous fixed-length segments associated with that existing speaker. Option 4, on the other hand, includes a probability proportional to the speaker assignment probability parameter $\alpha$. Accordingly, the UIS-RNN 300 predicts the probability distribution over possible speakers, i.e., the first speaker $y_7=1$, the second speaker $y_7=2$, the third speaker $y_7=3$, and the fourth speaker $y_7=4$, based on both the previous speaker label sequence $y_{[6]}$ and the previous observation sequence of embeddings $x_{[6]}$.

Figure 3A:
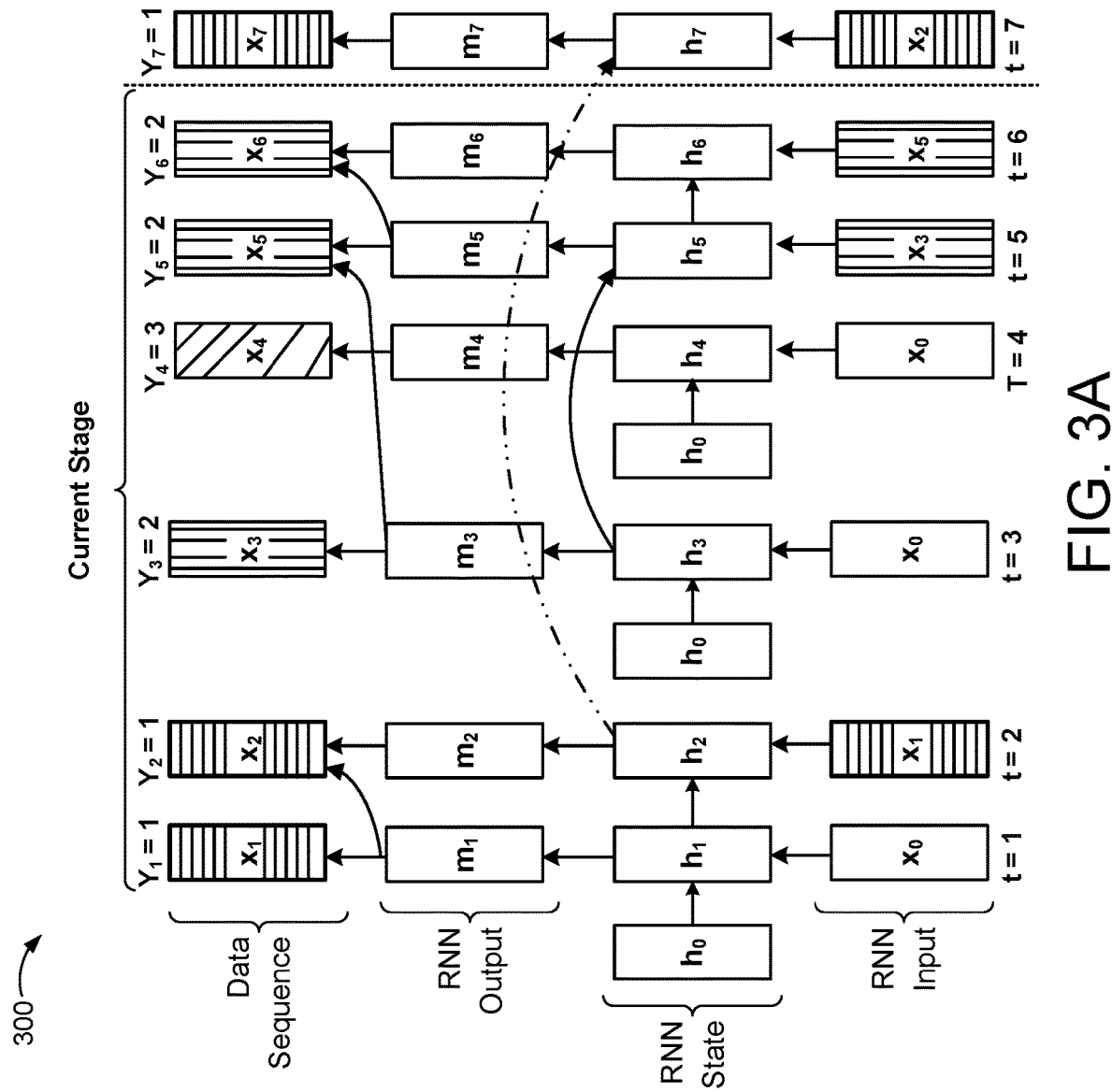
FIGS. 3A-3D schematically illustrate an example recurrent neural network model configured to predict probability distributions over possible speakers for fixed-length segments of an utterance of speech.

Referring to FIG. 3A, predicting the probability that $y_7$ is equal to the first speaker is based on the last embedding entry $x_2$ and the previous state $h_2$ corresponding to the first speaker. In this scenario, the current RNN state $h_7$ is modeled for the first speaker from the second RNN state $h_2$ and the second embedding entry $x_2$, which correspond to the previous RNN state and the previous embedding entry for the first speaker. The output of the current RNN state $h_7$ may interconnect with the corresponding node $M_7$ of the RNN output, whereby $M_7$ applies a layer of non-linear transformation of the standard RNN state $h_7$ to a state that is used for generating the actual observations (e.g., better transform the features in $h_7$). The probability that $y_7=1$ is proportional to the number of continuous fixed-length segments 220 associated with the first speaker.

Figure 3B:
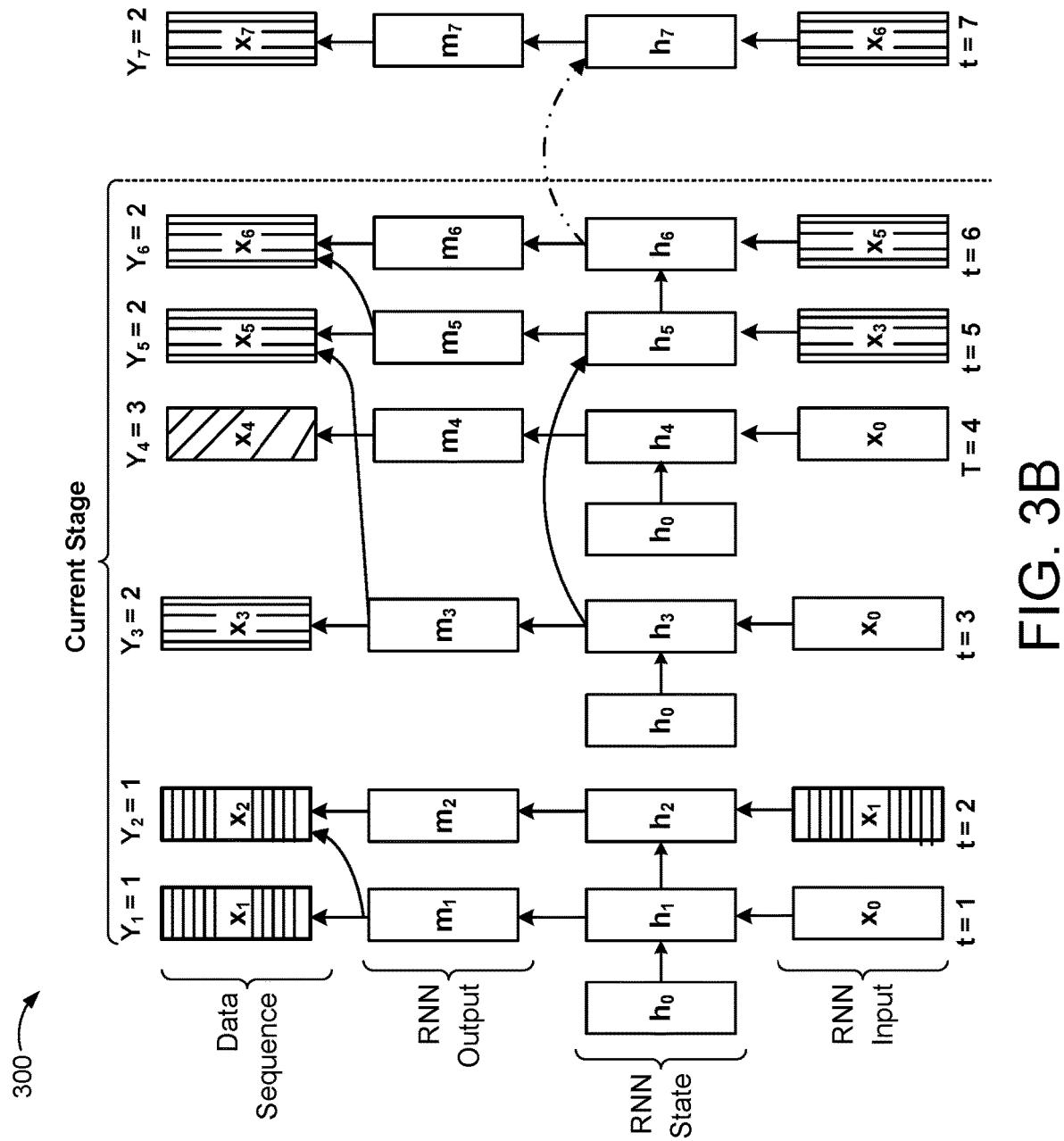

Referring to FIG. 3B, predicting the probability that $y_7$ is equal to the second speaker is based on the last embedding entry $x_6$ and the previous state $h_6$ corresponding to the second speaker. In this scenario, no speaker change will occur and the current RNN state $h_7$ is modeled for the second speaker from the sixth RNN state $h_6$ and the sixth embedding entry $x_2$, which correspond to the previous RNN state and the previous embedding entry for the second speaker. The output of the current RNN state $h_7$ may interconnect with the corresponding node $M_7$ of the RNN output, whereby $M_7$ applies a layer of non-linear transformation of the standard RNN state $h_7$ to a state that is used for generating the actual observations (e.g., better transform the features in $h_7$). The probability that $y_7=2$ is proportional to the number of continuous fixed-length segments 220 associated with the second speaker.

Figure 3C:
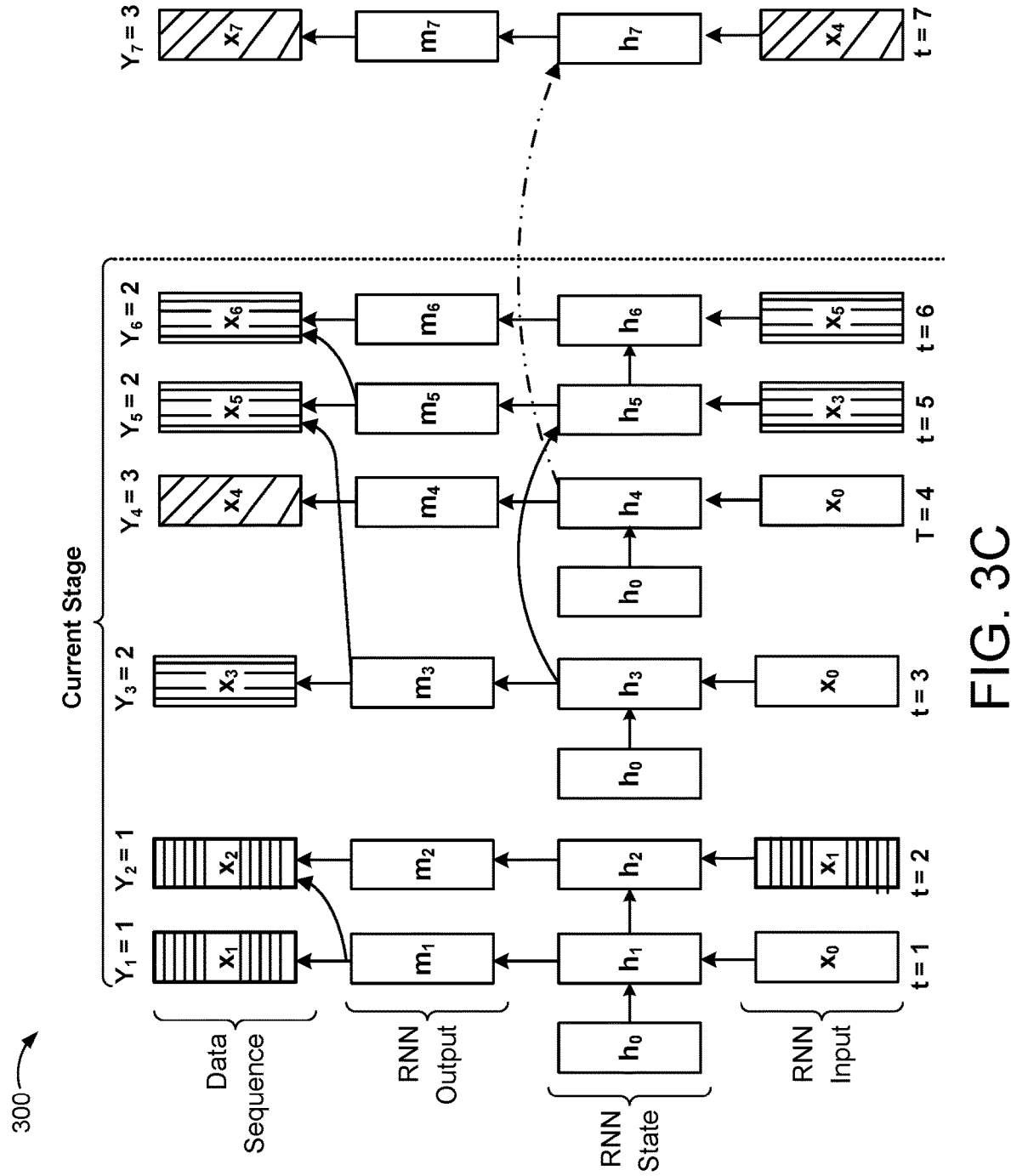

Referring to FIG. 3C, predicting the probability that $y_7$ is equal to the third speaker is based on the last embedding entry $x_3$ and the previous state $h_3$ corresponding to the third speaker. In this scenario, the current RNN state $h_7$ is modeled for the third speaker from the third RNN state $h_3$ and the third embedding entry $x_3$, which correspond to the previous RNN state and the previous embedding entry for the third speaker. The output of the current RNN state $h_7$ may interconnect with the corresponding node $M_7$ of the RNN output, whereby $M_7$ applies a layer of non-linear transformation of the standard RNN state $h_7$ to a state that is used for generating the actual observations (e.g., better transform the features in $h_7$). The probability that $y_7=3$ is proportional to the number of continuous fixed-length segments 220 associated with the third speaker.

Figure 3D:
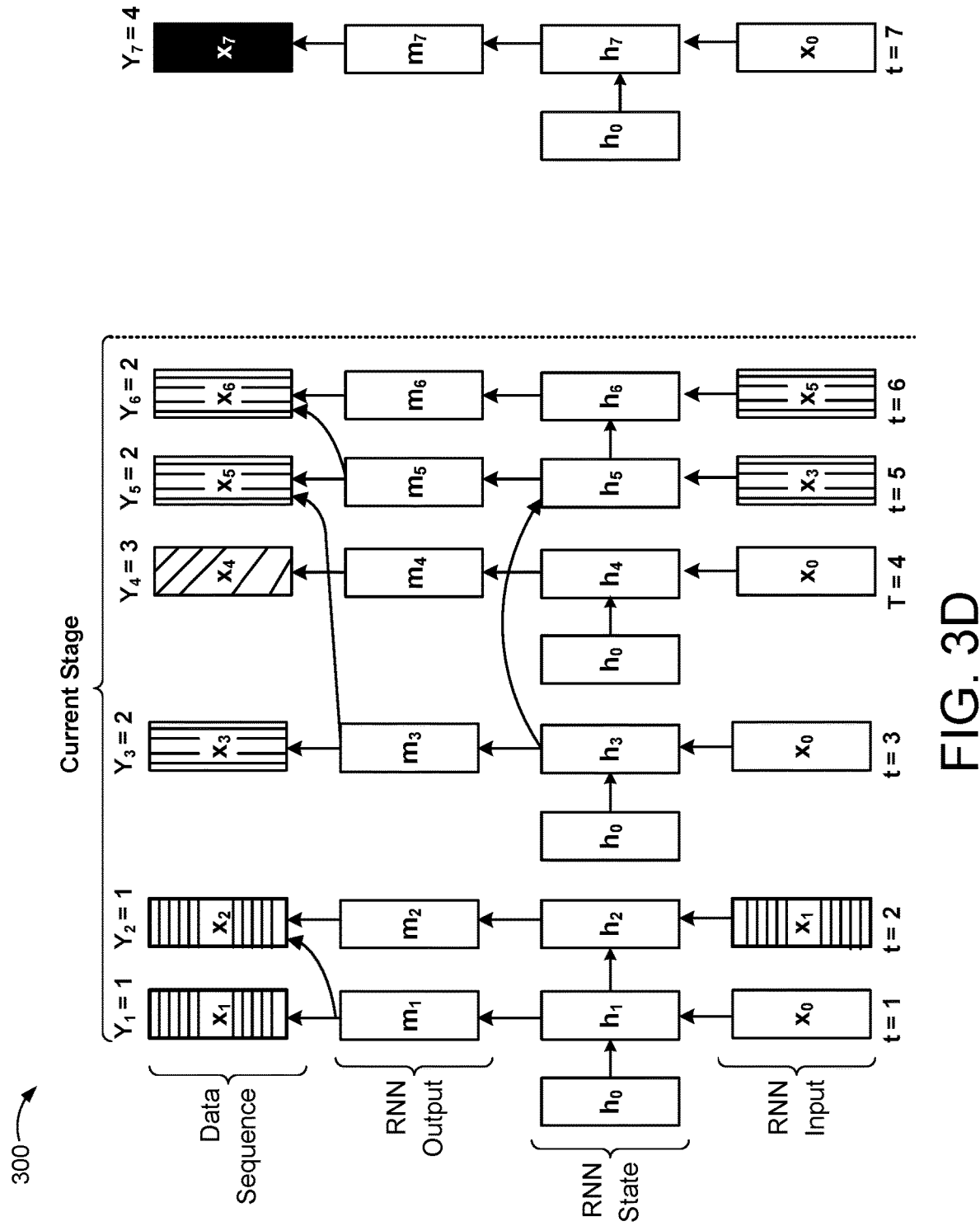

Referring to FIG. 3D, the probability that $y_7$ is equal to the fourth new speaker is proportional to the speaker assignment probability parameter α. In this scenario, the UIS-RNN 300 instantiates a new RNN for the fourth speaker where the current RNN state $h_7$ is modeled for the fourth speaker from the same initial hidden state $h_0$. Here, the new RNN instance for the fourth speaker share the same set of diarization parameters as the RNN instances for each of the first, second, and third speakers.

In some implementations, the diarization system 200 employs an online decoding approach which sequentially performs a greedy search on the probability distribution over possible speakers 262 ($y_7$: 1, 2, 3, 4) for the corresponding fixed-length segment $x_7$ to reduce a computational complexity from $O(T!)$ to $O(T^2)$. Based on observations that most scenarios the maximum number of speakers per-utterance is bounded by a constant C, the computational complexity can be further reduced to $O(T)$. In some examples, the diarization system performs a beam search on the decoding algorithm and adjusts a number of look-ahead entries to achieve better decoding results.

FIG. 4 is a table 400 illustrating diarization error rates (DERs) for k-means clustering, spectral clustering, a UIS-RNN pure 5-fold, a UIS-RNN Dick-6, and a UIS-RNN pure 5-fold plus extra training data for various speaker recognition models V1, V2, V3. The first speaker recognition model V1 may contain 36 million utterances from 18,000 U.S. English speakers, the second speaker recognition model V2 may contain 34 million utterances from 138,000 non-US English speakers, and the third speaker recognition model V3 updates the second speaker recognition model V2 by using variable-length windows. The results suggest that the biggest improvement in DER comes from upgrading the speaker recognition model form V2 to V3. UIS_RNN performs noticeably better than spectral offline clustering, when using the same speaker recognition model. It is also important to note that UIS-RNN predicts speakers labels in an online fashion during inference. When unsupervised clustering algorithms are performed online, they typically perform significantly worse than offline clustering algorithms such as spectral clustering. Additionally, the DER improved for the UIS-RNN when trained on extra training data, thereby indicating that the UIS-RNN model benefits from learning from more examples.

Figure 5:
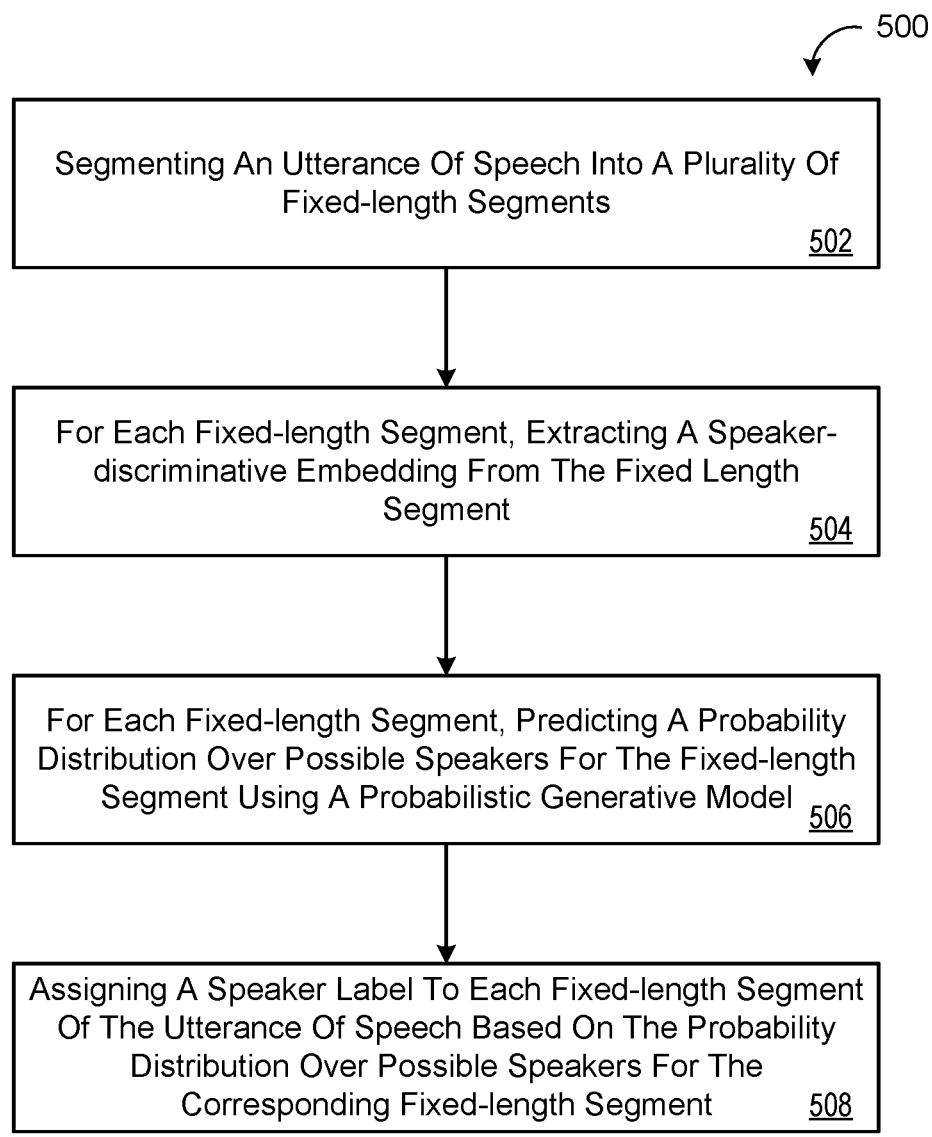
FIG. 5 is a flowchart of an example arrangement of operations for a method of assigning speaker labels to an utterance of speech.

FIG. 5 is a flowchart of an example arrangement of operations for a method 500 of performing speaker diarization on a received utterance of speech 120. The data processing hardware 112, 144 may execute the operations for the method 500 by executing instructions stored on the memory hardware 114, 146. At operation 502, the method 500 includes segmenting the utterance of speech 120 into a plurality of segments 220. The segments 220 may include fixed-length segments or variable-length segments. For each segment of the utterance of speech, the method 500 includes, at operation 504, extracting a speaker-discriminative embedding 240 from the segment 220, and at operation 506, predicting a probability distribution over possible speakers 262 for the segment 220 using a probabilistic generative model 300 configured to receive the speaker-discriminative embedding 240 as a feature input. The speaker-discriminative embedding 240 may include a d-vector in some examples. In other examples, the speaker-discriminative embedding 240 includes an i-vector. At operation 508, the method 500 includes assigning a speaker label 250 to each segment 220 of the utterance of speech 120 based on the probability distribution over possible speakers 262 for the corresponding segment 220.

The probabilistic generative model 300 is trained on a corpus of training speech utterances, where each utterance is segmented into a plurality of training segments 220T. Each training-fixed length segment 220T includes a corresponding speaker-discriminative embedding 240T and a corresponding speaker label 250T. The probabilistic generative model 300 may predict the probability distribution over possible speakers 262 for each segment 220 by applying a distance-dependent Chinese restaurant process. The probabilistic generative model 300 may include a recurrent neural network (RNN), with each speaker modeled by a corresponding RNN instance that does not share information with the RNN instances for the other speakers.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 6:
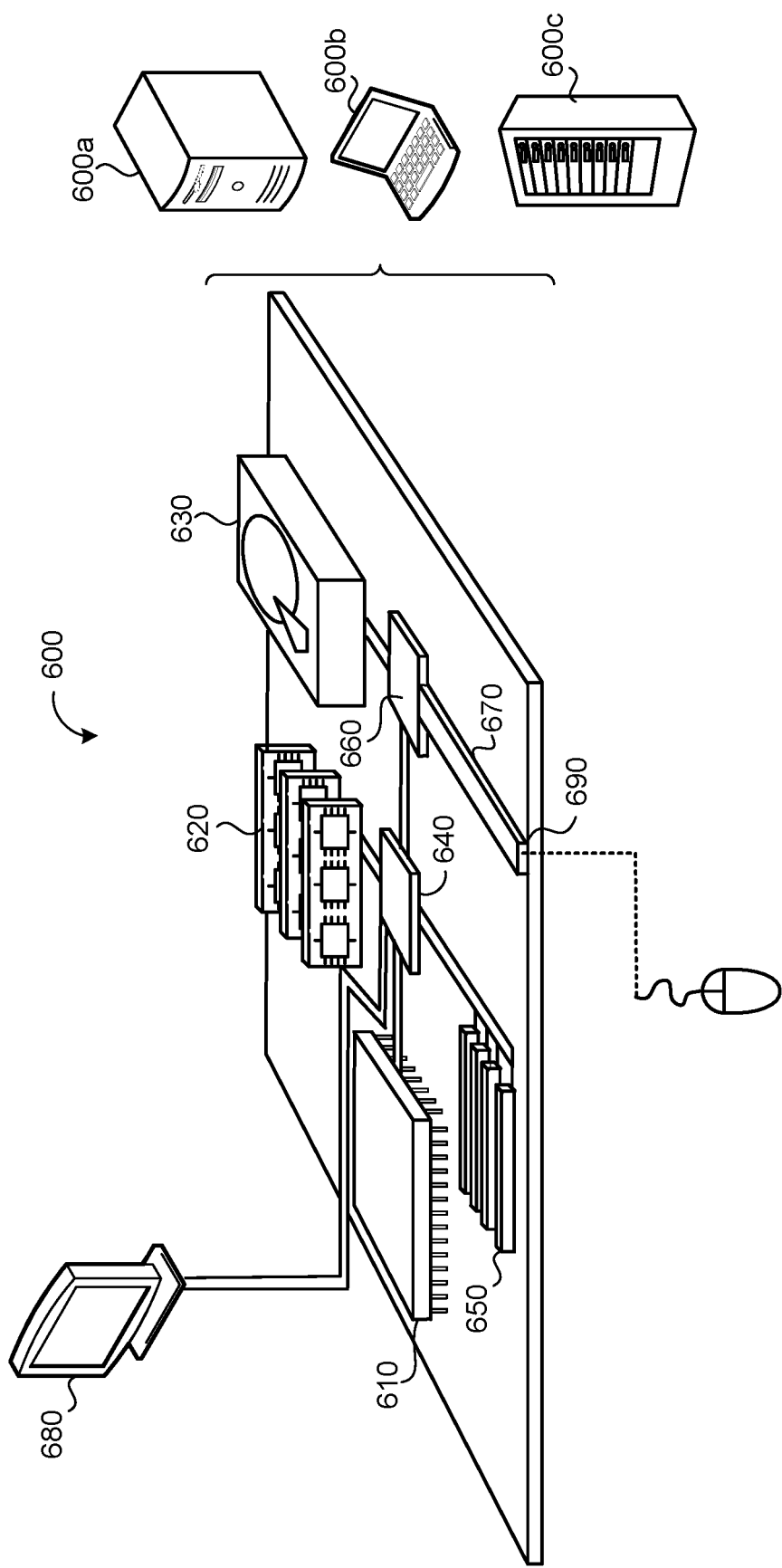
FIG. 6 is a schematic view of an example computing device that may be used to implement the systems and methods described herein.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed on data processing hardware causes the data processing hardware to perform operations comprising:
   receiving audio data corresponding to an utterance of speech;
   segmenting the audio data into a plurality of segments; and
   for a current speech segment occurring after an initial speech segment of the plurality of segments:
      extracting a current speaker-discriminative embedding from the current speech segment;
      predicting, using a neural network model configured to receive the current speaker-discriminative embedding extracted from the current speech segment as input, a probability distribution over possible speakers for the current speech segment by:
         for each of one or more existing speakers associated with a corresponding speaker label, predicting a probability that the current speaker-discriminative embedding includes the existing speaker based on a corresponding existing speaker-discriminative embedding that is assigned to the corresponding speaker label associated with the existing speaker; and
         predicting a probability that the current speaker-discriminative embedding includes a new speaker; and
      based on the probability distribution over possible speakers for the current speech segment, assigning, to the current speaker-discriminative embedding, a current speaker label as one of:
         a new speaker label associated with the new speaker; or
         the corresponding speaker label associated with one of the one or more existing speakers.

2. The computer-implemented method of claim 1, wherein segmenting the audio data comprises segmenting the audio data into a plurality of non-overlapping speech segments.

3. The computer-implemented method of claim 2, wherein segmenting the audio data comprises segmenting the audio data using a voice activity detector (VAD) configured to segment the audio data into the plurality of non-overlapping speech segments.

4. The computer-implemented method of claim 1, wherein the operations further comprise, for the initial speech segment of the plurality of speech segments:
   extracting a first speaker-discriminative embedding from the initial speech segment; and
   assigning a first speaker label associated with a first speaker to the first speaker-discriminative embedding.

5. The computer-implemented method of claim 1, wherein extracting the current speaker-discriminative embedding from the current speech segment comprises extracting a d-vector from the current speech segment.

6. The computer-implemented method of claim 1, wherein extracting the current speaker-discriminative embedding from the current speech segment comprises extracting an i-vector from the current speech segment.

7. The computer-implemented method of claim 1, wherein the operations further comprise:
   transcribing the utterance of speech into corresponding text; and
   annotating the text based on the current speaker label.

8. The computer-implemented method of claim 1, wherein segmenting the audio data into a plurality of segments comprises segmenting the audio data into a plurality of fixed-length segments.

9. The computer-implemented method of claim 1, wherein segmenting the audio data into a plurality of segments comprises segmenting the audio data into a plurality of variable-length segments.

10. The computer-implemented method of claim 1, wherein the data processing hardware resides on a user device or a distributed system.

11. A system comprising:
   data processing hardware;
   memory hardware in communication with the data processing hardware and storing instructions, that when executed by the data processing hardware, cause the data processing hardware to perform operations comprising:
      receiving audio data corresponding to an utterance of speech;
      segmenting the audio data into a plurality of segments; and
      for a current speech segment occurring after an initial speech segment of the plurality of segments:
         extracting a current speaker-discriminative embedding from the current speech segment;
         predicting, using a neural network model configured to receive the current speaker-discriminative embedding extracted from the current speech segment as input, a probability distribution over possible speakers for the current speech segment by:
            for each of one or more existing speakers associated with a corresponding speaker label, predicting a probability that the current speaker-discriminative embedding includes the existing speaker based on a corresponding existing speaker-discriminative embedding that is assigned to the corresponding speaker label associated with the existing speaker; and predicting a probability that the current speaker-discriminative embedding includes a new speaker; and based on the probability distribution over possible speakers for the current speech segment, assigning, to the current speaker-discriminative embedding, a current speaker label as one of:

a new speaker label associated with the new speaker; or the corresponding speaker label associated with one of the one or more existing speakers.

12. The system of claim 11, wherein segmenting the audio data comprises segmenting the audio data into a plurality of non-overlapping speech segments.

13. The system of claim 12, wherein segmenting the audio data comprises segmenting the audio data using a voice activity detector (VAD) configured to segment the audio data into the plurality of non-overlapping speech segments.

14. The system of claim 11, wherein the operations further comprise, for the initial speech segment of the plurality of speech segments:

extracting a first speaker-discriminative embedding from the initial speech segment; and assigning a first speaker label associated with a first speaker to the first speaker-discriminative embedding.

15. The system of claim 11, wherein extracting the current speaker-discriminative embedding from the current speech segment comprises extracting a d-vector from the current speech segment.

16. The system of claim 11, wherein extracting the current speaker-discriminative embedding from the current speech segment comprises extracting an i-vector from the current speech segment.

17. The system of claim 11, wherein the operations further comprise:

transcribing the utterance of speech into corresponding text; and annotating the text based on the current speaker label.

18. The system of claim 11, wherein segmenting the audio data into a plurality of segments comprises segmenting the audio data into a plurality of fixed-length segments.

19. The system of claim 11, wherein segmenting the audio data into a plurality of segments comprises segmenting the audio data into a plurality of variable-length segments.

20. The system of claim 11, wherein the data processing hardware resides on a user device or a distributed system.

* * * * *